April 15, 1930.   T. F. BAILY ET AL   1,754,845
SLAG REDUCING PROCESS
Filed Jan. 28, 1928
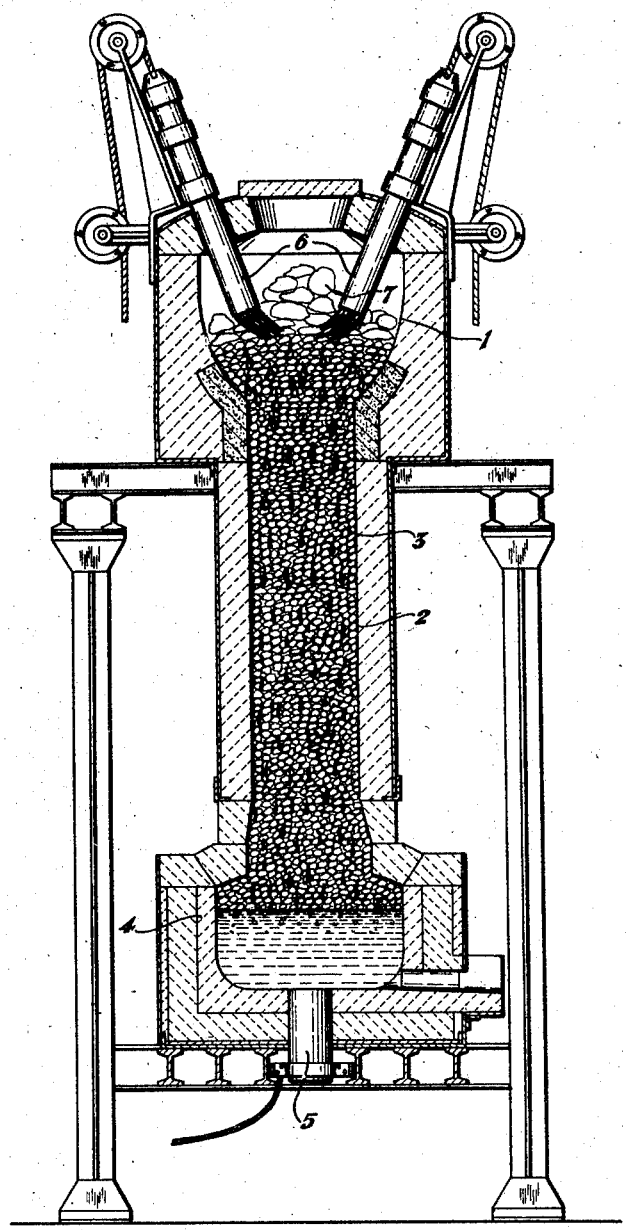
Inventor
T. F. Baily
L. G. Pritz
By Freas and Bond
Attorneys Patented Apr. 15, 1930

1,754,845

UNITED STATES PATENT OFFICE

THADDEUS F. BAILY, OF ALLIANCE, AND LAWRENCE G. PRITZ, OF CANTON, OHIO; SAID PRITZ ASSIGNOR TO SAID BAILY

SLAG-REDUCING PROCESS

Application filed January 28, 1928. Serial No. 250,223.

The invention relates to a process for recovering the oxide constituents from open hearth slag, Bessemer slag and the like.

In the manufacture of steel by either the acid or basic process, the slags which are usually regarded as refuse after being once used in the furnace contain large amounts of valuable constituents in the form of oxides, together with certain other materials as impurities or adulterants.

The acid slags contain approximately 50% $SiO_2$, 22% $MnO$, and 23% $FeO$, while the basic slag contains about 11% $SiO_2$, 22% $FeO$, 9% $MnO$, 6% $P_2O_5$ and 44% $CaO$.

All of the above mentioned materials found in the acid slags form valuable raw materials for the manufacture of silicon, manganese and iron, and the basic slag contains valuable raw materials for the manufacture of the above as well as phosphorus.

These slags having been once used in the furnace are ordinarily considered as refuse because no method has before been devised for recovering the valuable oxide constituents from the slag.

The object of the present invention is to provide a process for recovering the valuable raw materials from the slags, by separating them out as ferro-alloys or as a combined ferro-alloy to be used either with steel or iron.

Where basic slag is used, after the above named elements are reduced out of the slag, there is still left a considerable amount of $CaO$ or calcium oxide which can be used again, being the principal agent necessary in ferrous metallurgy for eliminating sulphur, and while there may be sulphur in the basic open hearth slag, this can be eliminated.

The above and other objects may be attained by placing the slag in a furnace in the presence of a reducing agent such as carbon and operating the furnace at a sufficient temperature to reduce the iron, manganese and phosphorus and take the same off as a ferromanganese phosphorus, the temperature of the furnace being then elevated to the reduction point of silicon and the silicon then removed separately, leaving the $CaO$ and such bases and alumina as may be contained in the original slag.

In the accompanying drawing, the figure is a vertical sectional view through a furnace such as may be used for carrying out the process.

Similar numerals refer to similar parts throughout the drawing.

Although the process may be carried out in various forms of furnaces, the drawing illustrates a type of furnace which is especially adapted for this purpose.

This furnace may comprise the melting chamber 1, communicating at its lower end with a shaft 2 which may be filled with a suitable reducing agent such as the coke shown at 3.

A crucible 4 may be provided at the lower end of the shaft to receive the molten material after the same has been reduced. This crucible may be provided with the electrode 5 whereby current may be passed through the bed of carbonaceous material between said electrode and the upper electrodes 6 in the melting chamber, the coke bed thus forming an electrical resistor.

In carrying out the process, assuming that basic slag is used, the slag is charged upon the top of the carbonaceous resistor as shown at 7 and the furnace may be operated at substantially a temperature of 2600 degrees Fahrenheit which is sufficient for rapid reduction of the iron, manganese and phosphorus which may be taken off as a ferromanganese phosphorus.

The silicon, of course, requires a higher temperature and after the other elements have been reduced and taken off, the furnace may be operated at a temperature of about 3,000 degrees Fahrenheit in order to reduce the silicon and separately remove the same, leaving the calcium oxide with such bases and alumina as may be contained in the original slag.

This calcium oxide may then be used over again.

In reducing the acid slag, the furnace may be first operated at about 2600 degrees Fahrenheit in order to reduce the iron and manganese and take the same off as a ferro-manganese, after which the temperature would be raised to about 3000 degrees Fahrenheit to reduce the silicon which may be taken off as above described.

When it is desired to make the usual grades of ferro-silicon, iron in the form of scrap steel or ore may be added and melted with the charge as there would usually be a deficiency of iron in the slags to form the usual grades of ferro-silicon.

The materials in the slag being agglomerated makes them more readily attacked by the reducing agent and melt at a lower temperature and less liable to loss through volatilization in melting than when these materials are charged in their natural and crude state.

If it is desired, the slag or slags may be finely crushed and mixed with carbon before or in charging so that as soon as the slag is in a pasty or molten condition, the carbon becomes intimately mixed with the slag and the reduction operation immediately begins, leaving less of the reduction operation to be carried on by the carbonaceous resistance material in the shaft.

In order to produce varying proportions of silicon, manganese, phosphorous and iron, it may be desirable to mix acid and basic slags or open hearth, Bessemer and other slags together in the charge so as to produce the desired ferro-alloy with a minimum of raw materials to obtain the desired finished product.

If it is desired, the slag or slags may be preheated or melted in a combustion furnace under an oxidizing atmosphere, and then charged into an electric furnace operating under a reducing atmosphere, and reduced.

We claim:

1. That process in the reduction of the oxides of a slag of the character described, which consists in charging basic and acid slag in such proportion as to obtain the desired mixture of ferro-alloy containing phosphorus, manganese, iron and silicon as desired, and melting and reducing them by passing the slag through a carbonaceous resistor material through which electric current is passed.

2. That process in the reduction of the oxides of a slag of the character described, which consists in charging basic and acid slag and iron and iron ore in such proportion as to obtain the desired mixture of ferro-alloy containing phosphorus, manganese, iron and silicon as desired, and melting and reducing them by passing the slag through a carbonaceous resistor material through which electric current is passed.

3. That process in the reduction of slag containing metallic oxides and silica which consists in first melting and reducing the metallic oxides to metal and removing them from the furnace, then raising the temperature of the molten silica in the presence of a reducing agent and reducing the silicon.

4. That process in the reduction of the oxides of slags which consists in finely crushing acid and basic slags, mixing carbon therewith and charging the mixture together with iron and iron ore in such proportion as to obtain the desired mixture of ferro-alloys containing phosphorus, manganese, iron and silicon as desired, and melting and reducing the charge by passing the slag through a carbonaceous resistor material through which electric current is passed.

5. That process in the reduction of the oxides of slags which consists in finely crushing acid and basic slags, mixing carbon therewith, and melting and reducing the charge by passing the slag through a carbonaceous resistor material through which electric current is passed.

In testimony that we claim the above, we have hereunto subscribed our names.

THADDEUS F. BAILY.
LAWRENCE G. PRITZ.